(12) United States Patent
Griswold

(10) Patent No.: US 8,247,514 B2
(45) Date of Patent: *Aug. 21, 2012

(54) SILYLATED POLYURETHANE COMPOSITIONS AND ADHESIVES THEREFROM

(75) Inventor: Roy M. Griswold, Ballston Spa, NY (US)

(73) Assignee: Momentive Performance Materials Inc., Albany, NY (US)

( * ) Notice: Subject to any disclaimer, the term of this patent is extended or adjusted under 35 U.S.C. 154(b) by 665 days.

This patent is subject to a terminal disclaimer.

(21) Appl. No.: 11/515,444

(22) Filed: Sep. 1, 2006

(65) Prior Publication Data

US 2008/0058492 A1    Mar. 6, 2008

(51) Int. Cl.
*C08G 77/04* (2006.01)

(52) U.S. Cl. ......... 528/28; 528/27; 528/29; 528/30; 528/38; 528/59; 525/440; 525/452; 525/460

(58) Field of Classification Search ............... 528/28, 528/29, 59, 588, 38, 61, 66; 525/440
See application file for complete search history.

(56) References Cited

U.S. PATENT DOCUMENTS

| | | | |
|---|---|---|---|
| 5,120,379 A | 6/1992 | Noda et al. | |
| 5,554,709 A * | 9/1996 | Emmerling et al. | 528/27 |
| 5,567,530 A | 10/1996 | Drujon et al. | |
| 5,804,253 A | 9/1998 | Hagiwara et al. | |
| 5,849,832 A | 12/1998 | Virnelson et al. | |
| 5,990,257 A * | 11/1999 | Johnston et al. | 528/28 |
| 6,136,446 A | 10/2000 | Virnelson et al. | |
| 6,150,441 A | 11/2000 | Chiba et al. | |
| 6,284,360 B1 | 9/2001 | Johnson et al. | |
| 6,372,827 B2 | 4/2002 | Johnson et al. | |
| 6,406,782 B2 | 6/2002 | Johnson et al. | |
| 6,457,294 B1 | 10/2002 | Virnelson et al. | |
| 6,784,272 B2 | 8/2004 | Mack et al. | |
| 6,828,403 B2 | 12/2004 | Mahdi et al. | |
| 7,189,781 B2 * | 3/2007 | Acevedo et al. | 524/588 |
| 7,569,653 B2 * | 8/2009 | Landon | 528/65 |
| 2002/0100550 A1 | 8/2002 | Mahdi et al. | |
| 2002/0194813 A1 | 12/2002 | Virnelson et al. | |
| 2004/0188016 A1 | 9/2004 | Mahdi et al. | |
| 2005/0009985 A1 * | 1/2005 | Selbertinger et al. | 524/589 |
| 2005/0119421 A1 | 6/2005 | Schindler et al. | |
| 2005/0119436 A1 * | 6/2005 | Ziche et al. | 528/29 |
| 2005/0137375 A1 * | 6/2005 | Hansen et al. | 528/44 |
| 2006/0247369 A1 * | 11/2006 | Griswold et al. | 524/588 |
| 2006/0247370 A1 * | 11/2006 | Frye et al. | 524/588 |
| 2007/0031680 A1 * | 2/2007 | Fromwiller et al. | 428/423.1 |
| 2007/0213465 A1 * | 9/2007 | Brand et al. | 525/123 |

FOREIGN PATENT DOCUMENTS

| | | |
|---|---|---|
| EP | 1 544 225 A | 6/2005 |
| JP | 56-082863 | 7/1981 |
| JP | 57-207663 | 12/1982 |
| JP | 59-172575 | 9/1984 |
| JP | 59-174672 | 10/1984 |
| JP | 61-047774 | 3/1986 |
| JP | 61-218631 | 9/1986 |
| JP | 61-218672 | 9/1986 |
| JP | 61-218673 | 9/1986 |
| JP | 62-057478 | 3/1987 |
| JP | 62-057479 | 3/1987 |
| JP | 62-057480 | 3/1987 |
| JP | 62-089782 | 4/1987 |
| JP | 03-259981 | 3/1991 |
| JP | 09-165565 | 6/1997 |
| WO | WO 2006/118766 A | 11/2006 |

* cited by examiner

*Primary Examiner* — Michael L Leonard
(74) *Attorney, Agent, or Firm* — Dominick G. Vicari; Joseph S. Ostroff; Wiggin and Dana LLP

(57) ABSTRACT

A silylated polyurethane composition containing polyester based polyurethane prepolymer. The silylated polyurethane composition when partially silylated is especially useful for pressure sensitive adhesives where it imparts superior adhesive and cohesive performance thereto.

23 Claims, No Drawings

SILYLATED POLYURETHANE COMPOSITIONS AND ADHESIVES THEREFROM

BACKGROUND OF THE INVENTION

This invention relates to silylated polymers and to pressure sensitive adhesive (PSA) compositions containing same.

There are certain adhesive applications for which solvent resistance is highly desirable. These include automotive, aerospace, industrial and consumer labels where exposure to aromatic, aliphatic solvents and oils occurs. Solvent-resistant adhesives are also required for labels used by analytical laboratories such as environmental and medical laboratories to prevent loss of critical sample identification information. Further applications include electronic labels or masked areas undergoing further processes; dry cleaning labels for garments; degreasing operations where identification labels or masked-off areas are required, and the like. Adhesive properties of many pressure sensitive or heat-activated adhesives are well suited for use with labels on various substrates. However, these are not significantly solvent-resistant and therefore it is highly desirable that a solvent-resistant adhesive be provided.

Solvent-resistant adhesive compositions are known in the art.

JP 56082863 describes a thermoplastic polystyrene-polybutadiene block copolymer or a mixture thereof with another thermoplastic rubber of ethylene-vinyl acetate copolymer combined with an acryl-modified polybutadiene.

JP 57207663 describes a compound comprised of ethylenic ionomer resin, a polyurethane resin, a polyethylene resin, a polyamide resin, a polyester resin, an agent for the thermal curing of a synthetic resin, and a thickener.

JP 59172575 describes a solvent-resistant hot melt adhesive comprised of a polyester amide containing terminal alkoxyl groups prepared by reacting an aminoalkylalkoxysilane compound with a polyester-amide containing terminal isocyanate groups.

JP 59174672 describes a solvent-resistant acrylic adhesive comprised of the reaction product a vinyl compound (e.g., methyl acrylate, isobutyl methacrylate, etc.) and a vinyl dioxazolone compound.

JP 61047774 describes a solvent-resistant adhesive comprised of amino group terminated polyamide resin reacted with a isocyanate group-containing alkoxysilane that is the addition product of, for example, hexamethylene diisocyanate and 3-aminopropyltriethoxy-silane.

JP 61218631 describes a solvent-resistant adhesive comprised of a silane-modified polyester resin obtained by reacting a polyester resin containing a hydroxyl group with an isocyanate group-containing hydrolyzable organosilicon compound.

JP 61218672 describes a solvent-resistant acrylic adhesive comprised of an unsaturated polyester resin having terminal ethylenic groups which is the reaction product of a ethylenic compound having isocyanate groups with terminal hydroxyl groups or carboxyl groups of an unsaturated polyester resin.

JP 61218673 describes a solvent-resistant acrylic adhesive comprised of an unsaturated polyester resin having terminal ethylenic double bonds obtained by reacting epoxy(meth)acrylate with the terminal carboxyl groups of an unsaturated polyester resin having ethylenic double bond in the molecule.

JP 62057480 describes a solvent-resistant adhesive comprised of a polyamide resin having terminal ethylenic double bonds obtained by reacting a compound having aziridinyl and ethylenic groups with terminal carboxyl groups of a polyamide resin.

JP 62057479 describes a solvent-resistant adhesive comprised of an unsaturated polyester resin having both terminal and in-chain ethylenic double bonds obtained by reacting a compound having aziridinyl and ethylenic groups with terminal carboxyl groups of an unsaturated polyester resin.

JP 62057478 describes a solvent-resistant adhesive comprised of an unsaturated polyester resin having terminal and in-chain ethylenic double bonds obtained by reacting a terminal hydroxyl group of an unsaturated polyester resin with an epoxy (meth)acrylate.

JP 62089782 describes a solvent-resistant adhesive obtained by reaction between a high-molecular weight diol, preferably a polyester diol of polyethylene-butylene-adipate, a divalent isocyanate compound, a chain extender and a hindered nitrogen atom compound such as one containing a piperizine ring.

JP 03259981 describes a solvent-resistant adhesive comprised of a composition prepared by compounding a block copolymer and an isocyanate prepolymer. The block copolymer comprises a block consisting of at least two kinds of aromatic vinyl monomer and a block consisting of at least one kind of a conjugated diene monomer in which at least 50% of carbon-carbon double bonds in the block have been hydrogenated (e.g. a hydrogenated styrene-isoprene-styrene triblock copolymer). The isocyanate prepolymer is obtained by reacting an isocyanate compound with a liquid polymer which comprises a polymer of isoprene or isoprene-butadiene mixture and has 1.5-5.0 hydroxyl groups in the molecule and in which at least 50% of the carbon-carbon double bonds have been hydrogenated.

JP 09165565 describes a solvent-resistant adhesive composition which is a blend of a base polymer with a tackifier resin and, optionally, a softening agent or a wax, a block copolymer which comprises one or more hydrogenated butadiene polymer blocks, one or more of aromatic vinyl compound polymer blocks and one or more polymer blocks substantially having an olefin polymer structure.

SUMMARY OF THE INVENTION

In accordance with the present invention, there is provided a silylated polyurethane composition comprising silylated polyurethane prepolymer obtained from the silylation of a polyurethane prepolymer derived from the reaction of polyester polyol possessing an average of at least about 2.05 hydroxyl groups and polyisocyanate.

In accordance with another aspect of the invention herein, there is provided a moisture-curable pressure sensitive adhesive composition possessing improved adhesive and cohesive properties comprising polyester-based silylated polymer and, optionally, one or more adhesive compositions.

Further in accordance with the present invention, blends of silane-terminated polybutadiene polyurethane or silicone or organic (e.g., natural rubber, SBR, SIS, acrylic, isoprene, polyurethanes) adhesives with silane-terminated polyester polyurethane adhesive are provided as a means of modifying the peel adhesion and other properties, as more fully described herein below.

DETAILED DESCRIPTION OF THE INVENTION

The silylated polymer of this invention is derived from hydroxyl-terminated polyester polyol that is reacted with polyisocyanate to provide hydroxyl-terminated and/or isocyanate-terminated polyurethane prepolymer. Silylation of the hydroxyl-terminated and/or isocyanate-terminated polyurethane prepolymer can be accomplished by reacting the prepolymer with a silane possessing at least one hydrolyzable group and at least one functionality which is reactive for isocyanate, i.e., an active hydrogen-containing group such as hydroxyl, carboxylic acid, mercapto, primary amino or secondary amino.

Polyester Polyol

The hydroxyl-terminated polyester polyol of the present invention are polyesters having at least two hydroxyl groups (usually 2 to 4 hydroxyl groups) and having each end of polyester molecules thereof terminated with hydroxyl groups. When the polyester polyol has 2 hydroxyl groups, both at the ends, it may be thought of as a hydroxyl-terminated polyester diol.

Hydroxyl-terminated polyester polyols of the above-described type, averaging more than one predominantly primary hydroxyl group, e.g., averaging from about 2.0 or more primary hydroxyl groups, are suitably employed herein. The hydroxyl-terminated polyester polyols will possess an average of at least about 2.0, and advantageously from about 2.1 up to about 4.5, hydroxyl groups, the hydroxyl groups being predominantly in terminal positions. In one embodiment of the present invention, blends of hydroxyl-terminated polyester polyols possessing various averages of hydroxyl group of the blend which range from about 2.05 to about 2.75 are provided.

The polyester polyols of the present invention can be obtained by reacting a polybasic acid component and a polyhydric alcohol component.

As the polybasic acid component, there may be mentioned terephthalic acid, isophthalic acid, phthalic acid, malonic acid, dimethylmalonic acid, succinic acid, glutaric acid, adipic acid, trimethyladipic acid, pimelic acid, 2,2-dimethylglutaric acid, azelaic acid, sebacic acid, fumaric acid, maleic acid, itaconic acid, 1,3-cyclopentanedicarboxylic acid, 1,2-cyclohexanedicarboxylic acid, 1,4-cyclohexanedicarboxylic acid, 2,5-norbornanedicarboxylic acid, 1,4-naphthalic acid, diphenic acid, 4,4'-oxydibenzoic acid, diglycolic acid, thiodipropionic acid, 2,5-naphthalenedicarboxylic acid and the like. These polybasic acids may be in the form of acid anhydrides, esters, chlorides, etc.

Polybasic carboxylic acids having three or more carboxyl groups, such as trimellitic acid, trimellitic anhydride, pyromellitic acid, pyromellitic anhydride, 4-methylcyclohexene-1,2,3-tricarboxylic anhydride, trimesic acid, 5-(2,5-dioxotetrahydrofurfuryl)-3-methyl-3-cyclohexene-1,2-dicarboxylic anhydride, may be used in small amounts in combination with the aforementioned dicarboxylic acids.

As the polyhydric alcohol component, there may be mentioned ethylene glycol, diethylene glycol, propylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, 2,2-dimethyl-1,3-propanediol (neopentyl glycol), 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-thiodiphenol, 4,4'-methylenediphenol, 4,4'-(2-norbornylidene)diphenol, 4,4'-dihydroxybiphenol, o-, m- and p-dihydroxybenzene, 4,4'-isopropylidenediphenol, 4,4'-isopropylidenebis(2,6-dichlorophenol), 2,5-naphthalenediol, p-xylylenediol, cyclopentane-1,2-diol, cyclohexane-1,2-diol, cyclohexane-1,4-diol, and etherified diphenols such as bisphenol A-alkylene oxide adducts, and so forth. A small amount of a polyhydric alcohol having three or more hydroxyl groups may be used in combination, as the case may be.

As the polyhydric alcohol having three or more hydroxyl groups, there may be mentioned glycerol, trimethylolpropane, 1,2,6-hexanetriol, trimethylolethane, pentaerythritol, dipentaerythritol, tripentaerythritol and sorbitol, among others.

The polyol should preferably have a molecular weight of 600 to 6000, more preferably 1000 to 5000. Examples of polyester polyols include hydroxyl-terminated polyester polyol and polycaprolactone. The former is produced by polymerizing an aliphatic carboxylic acid (such as malonic acid, succinic acid, and adipic acid) or an aromatic carboxylic acid (such as phthalic acid and terephthalic acid) or a mixture thereof with an aliphatic glycol (such as ethylene glycol, propylene glycol and diethylene glycol) or a triol (such as trimethylolpropane and glycerin). The latter is obtained by the ring opening polymerization of lactone.

Suitable polyesters of the present invention, include but are not limited to aromatic polyester polyols such as those made with phthallic anhydride (PA), dimethylterapthalate (DMT) polyethyleneterapthalate (PET) and aliphatic polyesters, and the like. Other suitable commercially available polyester polyol includes Inolex Lexorez® polyols, Bayer AG Desmophen® polyols, Stepan Stepanpol® polyols, Terathane® polyols.

The Polyurethane Prepolymer

Isocyanate-Terminated Polyurethane Prepolymer

Isocyanate-terminated polyurethane prepolymers, useful in the present invention, are prepared by reacting an excess of organic polyisocyanate with one or more of the foregoing hydroxy terminated polyester polyols and/or copolymers, generally, in the presence of a catalyst. As used herein, the term "polyisocyanate" means an organic compound possessing two or more isocyanate groups. The reaction temperature is typically in the range of from about 60° to about 90° C.; the reaction time is typically from about 24 to about 48 hours.

In addition to the hydroxyl-terminated polyester-based polymer, the reaction mixture can contain one or more chain extenders and/or one or more other polyols. Examples of suitable chain extenders are polyhydric alcohols such as ethylene glycol, propylene glycol, propane-1,3-diol, butane-1,4-diol, hexane-1,6-diol, diethylene glycol, triethylene glycol, tetraethylene glycol, dipropylene glycol, triethylene glycol, tetrathylene glycol, dipropylene glycol, tripropylene glycol, tetrapropylene glycol and the like. Additional polyols include polyether polyols, polyester polyols, polyetherester polyols, polyesterether polyols, polybutadienediols, polyoxyalkylene diols, polyoxyalkylene triols, polytetramethylene glycols, polycaprolactone diols and triols, and the like, all of which possess at least two primary hydroxyl groups.

Suitable organic polyisocyanates include any of the known and conventional organic polyisocyanates, especially organic diisocyanates, from which polyurethane polymers have heretofore been prepared. Useful diisocyanates include, for example, 2,4-toluene diisocyanate, 2,6-toluene diisocyanate, 4,4'diphenyl-methanediisocyanate, isophorone diisocyanate, dicyclohexylmethane-4,4'-diisocyanate, various liquid diphenylmethane-diisocyantes containing a mixture of 2,4- and 4,4' isomers, Desmodur N® (Bayer) and the like, and mixtures thereof. Isophorone diisocyanate is especially advantageous for use in preparing the polyurethane prepolymers herein.

Suitable catalysts useful in the preparation of the polyurethane prepolymers are known in the art, e.g., organoamine and organotin catalysts. Suitable catalysts include dialkyltin dicarboxylates such as dibutyltin dilaurate and dibutyltin acetate, tertiary amines, the stannous salts of carboxylic acids such as stannous octoate and stannous acetate, and the like.

To prepare isocyanate-terminated polyurethane prepolymers, at least a slight excess of the isocyanate equivalents (NCO groups) with respect to the hydroxyl equivalents (OH groups) is employed to terminate the polyester polyol and/or copolymer(s) with isocyanate groups. Advantageously, the molar ratio of NCO to OH is from about 1.1 to about 4.0 depending on the selection of the particular hydroxyl-terminated polyester polyol and/or copolymer(s), optional chain extenders and optional non-butadiene based polyols.

Hydroxyl-Terminated Polyurethane Prepolymer

Hydroxyl-terminated polyurethane prepolymers, useful in the present invention, can be prepared by the reaction of an organic polyisocyanate, e.g., a diisocyanate such as any of those mentioned above, and advantageously isophorone diisocyanate, with a stoichiometric excess of the selected hydroxyl-terminated polyester polyol and/or copolymer(s). Depending on the reactivity of the respective reactants, a catalyst such as any of those mentioned above can be employed. The reaction temperature is typically in the range of from about 60° to about 90° C.; the reaction time is typically on the order of from about 24 to about 48 hours. The reaction mixture can also contain one or more chain extenders and/or other polyols such as any of those mentioned above.

To prepare the hydroxyl group-terminated polyurethane prepolymers, at least a slight excess of the hydroxyl equivalents (OH groups) with respect to the NCO isocyanate equivalents (NCO groups) is employed to terminate the polyester chains with hydroxyl groups. Advantageously, the molar ratio of NCO to OH is from about 0.3 to about 0.95, and more preferably from about 0.5 to about 0.90, depending on the specific hydroxyl-terminated polyester employed.

The Silylated Polyurethane Prepolymer

Silylated Isocyanate-Terminated Polyurethane Prepolymer

Silylation of the isocyanate-terminated polyurethane prepolymer described herein above can be accomplished by reacting the prepolymer with a silane possessing at least one hydrolyzable group and at least one functionality which is reactive for isocyanate, i.e., an active hydrogen-containing group such as hydroxyl, carboxylic acid, mercapto, primary amino or secondary amino. Advantageously, the silane is a primary or secondary aminosilane of the general formula:

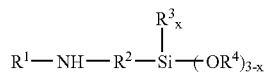

$$R^1-NH-R^2-\underset{\underset{}{|}}{Si}(OR^4)_{3-x}$$
$$\phantom{R^1-NH-R^2-}R^3_x$$

wherein $R^1$ is hydrogen or an alkyl group of from 1 to 10 carbon atoms, $R^2$ is a divalent alkylene group of from 3 to 10 carbon atoms, $R^3$ and $R^4$ each independently is an alkyl group of from 1 to 6 carbon atoms or an aryl group of from 6 to 8 carbon atoms, and x has a value of 0, 1 or 2.

Examples of aminosilanes for use in the silylation procedure herein are 3-aminopropyltrimethoxysilane, 3-aminopropyltriethoxysilane, 4-amino-3,3-dimethylbutyltrimethoxysilane, 4-amino-3,3-dimethylbutyldimethoxymethylsilane, N-methyl-3-amino-2-methylpropyltrimethoxysilane, N-ethyl-3-amino-2-methylpropyltri-methoxysilane, N-ethyl-3-amino-2-methylpropyldiethoxymethylsilane, N-ethyl-3-amino-2-methylpropyltriethoxy silane, N-ethyl-3-amino-2-methylpropylmethyldimethoxysilane, N-butyl-3-amino-2-methylpropyltrimethoxysilane, 3 (N-methyl-2-amino-1-methyl-1-ethoxy)-propyltrimethoxysilane, N-ethyl-4-amino-3,3-dimethylbutyldimethoxy-methylsilane and N-ethyl-4-amino-3,3-dimethylbutyltrimethoxysilane trimethoxysilane.

For applications such as use in sealant and coating compositions, the polyurethane prepolymers can be substantially fully silylated, i.e., all, or substantially all, of the isocyanate groups can be reacted with silane to provide a completely silylated polyurethane polymer.

However, where the silylated polyurethane polymer is to be incorporated into pressure sensitive adhesive compositions, it is important that the silylation be conducted to less than completion in order that the extent of crosslinking that occurs on subsequent cure of the silylated polymer not be so great as to adversely affect, and even eliminate, the pressure sensitive adhesive characteristics of the crosslinked polymer.

In conducting a partial silylation reaction, it can be useful to include a primary monoamine such as N-ethylbutylamine or similar capping reactant together with the silane as the amine will readily end-cap isocyanate groups thereby precluding them from reacting with the silane. The optimal amounts of silane and optional amine for achieving this less-than-complete silylation operation can be readily determined for a given isocyanate-terminated prepolymer employing known and conventional experimental techniques. Silylation of not more than about 95 percent, and advantageously not more than about 90 percent, of the total isocyanate groups present in the prepolymer is generally suitable for most pressure sensitive adhesive applications.

Silylated Hydroxyl-Terminated Polyurethane Prepolymer

Silylation of the hydroxyl-terminated polyurethane prepolymer described herein above can be accomplished by reacting the prepolymer with an isocyanatosilane. Suitable isocyanatosilanes are those of the general formula:

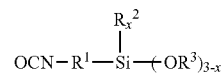

$$OCN-R^1-\underset{\underset{}{|}}{Si}(OR^3)_{3-x}$$
$$\phantom{OCN-R^1-}R^2_x$$

wherein $R^1$ is a divalent alkylene group of from 3 to 10 carbon atoms, $R^2$ and $R^3$ each independently is an alkyl group of from 1 to 6 carbon atoms or an aryl group of from 6 to 8 carbon atoms, and x has a value of 0, 1 or 2.

Examples of such isocyanatosilanes for use in the silylation procedure are λ-isocyanatopropyltrimethoxysilane, λ-isocyanatopropyltriethoxy-silane, λ-isocyanatomethylpropyltrimethoxysilane, λ-isocyanatomethylpropyltriethoxysilane, λ-isocyanatopropylmethyldimethoxysilane, λ-isocyanatopropyldimethylmethoxysilane and λ-isocyanatomethylpropyldimethylmethoxysilane.

As in the case of the silylated isocyanate-terminated polyurethanes described above, the silylation of the hydroxyl-terminated polyurethane prepolymers herein will be substantially complete, i.e., essentially no hydroxyl groups will be present following silylation, where the silylated polymers are to be incorporated in such products as sealants and coatings.

However, silylation will be incomplete, or partial, where the silylated polymers are to be incorporated in pressure sensitive adhesive compositions. In the case of incomplete silylation, levels of silylation of not more than about 95 percent, and advantageously, not more than about 90 percent, of the total hydroxyl groups present in the prepolymer is generally suitable and can be achieved by appropriate adjustment of the amounts of isocyanatosilane being reacted for a given prepolymer.

In order to facilitate control over the extent of incomplete silylation, it may be advantageous to include a hydroxyl-reactive monofunctional reactant with the isocyanatosilane. Suitable reactants for this purpose include monoisocyanates such as n-butylisocyanate. These and similar reactants serve to cap some of the hydroxyl groups of the prepolymer preventing them from undergoing silylation. Amounts of such hydroxyl-reactive monomeric reactants and isocyanatosilanes that can be utilized for partial silylation herein can be readily determined for a specific hydroxyl-terminated polyurethane prepolymer employing routine experimental testing.

In one embodiment of the invention, additional adhesive materials, such as, for example, silane-terminated polybutadiene polyurethane or silicone or organic (natural rubber, SBR, SIS, acrylic, isoprene, polyurethanes) adhesives can be blended with silane-terminated polyester polyurethane to prepare adhesives that offer a means of modifying the peel adhesion, as shown in the Examples described below, and other properties, e.g., drug delivery rates. In the later case, typically adhesives, such as, for example PIB (polyisobutylene), acrylic and silicone are blended for adhesion against skin and modification of drug delivery rates.

Pressure Sensitive Adhesive Compositions

Pressure sensitive adhesive compositions possessing superior adhesive and cohesive properties can be obtained with the partially silylated polyurethanes described above. In addition to the partially silylated polyurethanes, a pressure sensitive adhesive composition in accordance with the invention will typically include one or more additives such as fillers, tackifiers, silane adhesion promoters, plasticizers, solvents, thixotropic agents, U.V. stabilizers, antioxidants, cure catalysts, etc., in the usual amounts.

Typical fillers suitable for addition to the pressure-sensitive adhesive compositions of this invention include fumed silica, precipitated silica and calcium carbonates. Treated calcium carbonates having particle sizes from about $0.07\mu$ to about $4\mu$ are particularly useful and are available under several trade names: Ultra Pflex, Super Pflex, Hi Pflex from Specialty in Minerals; Winnofil SPM, SPT from Zeneca Resins; Hubercarb 1at, Hubercarb 3Qt and Hubercarb W from Huber and Kotomite from ECC. These fillers can be used either alone or in combination. The fillers can comprise up to about 200 parts per 100 parts of the silylated polymer component(s) with from about 80 to about 150 parts filler per 100 parts polymer being suitable for many adhesive applications.

The pressure sensitive adhesive composition can contain from about 20 to about 60 parts, and advantageously from about 30 to about 50 parts, of one or more known of conventional tackifiers per 100 parts of silylated polyurethane polymer. Examples of suitable tackifiers are MQ silicone resins (for which a curing catalyst such as benzoyl peroxide will ordinarily be included), terpene oligomers, coumarone/indene resins, aliphatic, petrochemical resins, and modified phenolic resins.

Silane adhesion promoters can be employed at levels of from about 0.5 to about 5 parts per hundred parts of the silylated polyurethane polymer with from about 0.8 to about 1.5 parts per hundred parts polymer being especially advantageous. Suitable adhesion promoters include Silquest® A-1120 silane, Silquest® A-2120 silane, Silquest® A-1170 silane and Silquest® A-187 silane, all of which are available from GE Silicones.

Exemplary plasticizers include phthalates, dipropylene and diethylene glycol dibenzoates and mixtures thereof, epoxidized soybean oil, and the like. Dioctyl and diisodecylphthalate are commercially available under the trade names Jayflex® DOP and JayFlex® DIDP from Exxon Chemical. The dibenzoates are available as Benzoflex® 9-88, Benzoflex® 50 and Benzoflex® 400 from Velsicol Chemical Corporation. Epoxidized soybean oil is available from Houghton Chemical Corporation as Flexol® EPO. The plasticizer can comprise up to about 100 parts of the silylated polyurethane polymer with from about 40 to about 80 parts per hundred parts of silylated polymer being satisfactory in many cases.

Useful solvents include aromatic, aliphatic and esters ranging in amounts of from about 25 to about 75 per hundred parts by weight of silylated polyurethane prepolymer.

Illustrative of useful thixotropic agents are various castor waxes, fumed silica, treated clays and polyamides. These additives typically comprise about 1 to about 10 parts per hundred parts of silylated polyurethane prepolymer with from about 1 to about 6 parts being useful for most applications. The thixotropes include those available as: Aerosil® from Degussa, Cabo-Sil® TS 720 from Cabot, Castorwax® from CasChem, Thixatrol® and Thixcin® from Rheox and Dislon® from King Industries. If the thixotrope is reactive with silane (e.g., silica), adjustments to the amount formulated may be needed to compensate therefor.

U. V. stabilizers and/or antioxidants can be incorporated into the pressure sensitive adhesive compositions of this invention in an amount of from 0 to about 5 parts per hundred parts silylated polyurethane polymer with from about 0.5 to about 2 parts providing generally good results. These materials are available from Ciba-Geigy under the trade names Tinuvin® 770, Tinuvin® 327, Tinuvin® 213, Tinuvin® 622 and Irganox® 1010.

Suitable cure catalysts are the same as those previously described for preparation of the silylated polyurethane polymers. The catalysts typically compromise from about 0.01 to about 3 parts per hundred parts polymer with from about 0.01 to about 1.0 parts per hundred parts of polymer being entirely suitable in many cases.

After mixing, the pressure sensitive adhesive compositions are cured by exposure to moisture. Curing conditions typically include ambient temperature, e.g., about 23° C. and 50% relative humidity for 3 days and 37° C. and 95% relative humidity for another 4 days. Alternatively water can be dissolved in an appropriate solvent such as isopropanol followed by mixing with the adhesive composition and coated, cured in conventional adhesive cure ovens known in the art.

The following examples are illustrative of the silylated polyurethane polymers and blends of silylated polyurethane polymers of this invention and pressure sensitive adhesive compositions containing same.

Example 1

To a resin reaction vessel equipped with mixing capability, condenser, nitrogen atmosphere and heating was added 11.0 g of hydroxyl terminated polyester Lexorez® 1842-90 a poly (diethylene glycol glycerine adipate) resin containing a hydroxyl number of 90, 99.0 g of hydroxyl terminated polyester Lexorez® 1640-35 a poly(1,4-butanediol neopentyl glycol adipate) resin containing a hydroxyl number of 35, and 174.0 g ethyl acetate. The average OH groups calculated for this blend of polyols was 2.22. These resins were refluxed to reduce moisture. It was cooled to 75-80° C. then 0.09 g of a 10 wt % solution of dibutyltin bis(acetylacetonate) was added and agitated for 15 minutes. Next 8.3 g of isophorone diisocyanate (NCO/OH=0.93) was added with agitation. The temperature was maintained at 75+/−1° C. until the wt % NCO was determined per standard methodology was found to be less than 0.01 wt %. At this point 1.0 g of 3-isocyanatopropyltrimethoxysilane was added and agitation continued at temperature until wt % NCO was determined to be 0.01%. Solids were determined to be 39.2 wt % and viscosity of 4800 cps using a Brookfield HATDV-II, spindle 6 at 50 rpm.

Approximately a 25 g sample of the reaction product was dissolved in 13 g of ethyl acetate, 2 drops of a 10 wt % dimethyltin bis[(1-oxoneodecyl)oxy]stannane in toluene solution, 0.4 g water were mixed thoroughly then allowed to set for 30 minutes at which time the solution was bar coated onto 50 micron PET film. After a 10 minute air dry period the adhesive was placed in a 150° C. oven for 2 minutes. Adhesive thickness was determined to be 22 microns. Lap shear samples were prepared with 1.0 inch×1.0 inch overlap onto a glass slide and 10 g weight attached then placed in stirred xylene using a jig to achieve a 2° off-set from vertical. Time to failure was >24 hours. A similar lap shear failure time of 6 hours 30 minutes was determined using a textured delrin cassette with 0.25 inch×0.87 inch lap, 10 g weight attached for 57 micron adhesive thickness coated tapes. The Shear Adhesion Failure Temperature (SAFT) for a 1 inch×1 inch on stainless steel, 1 Kg weight was determined to be 220° C. for the 22 micron adhesive thickness coated tapes. Probe tack results also for the 22 micron adhesive thickness tapes for 100 g/cm$^2$ applied force was 653 g/cm$^2$, and at 1000 g/cm$^2$ applied force was 752 g/cm$^2$. Peel Adhesion for 1 inch tapes applied to and allowed 20 minute dwell prior to testing, then peeled at 300 mm/minute 180° was 1494 g/25 mm, glass 1040 g/25 mm, aluminum 1529 g/25 mm, smooth delrin 468 g/25 mm, BOPP 1160 g/25 mm, polycarbonate 1703 g/25 mm, PMMA 2360 g/25 mm, PVC 1118 g/25 mm, and HDPE 823 g/25 mm demonstrating a wide range of peel adhesions.

Example 2

Example 2 (Illustrates blending with two silylated polyurethane adhesives of different compositions-polybutadiene and polyester).

Adhesive I of Example 2 was prepared as follows: To a resin reaction vessel equipped with mixing capability, condenser, nitrogen atmosphere and heating was added 72.5 g of hydroxyl terminated polybutadiene Krasol® LBH-P 2000 resin containing a hydroxyl number of 46, 145.0 g of hydroxyl terminated polybutadiene Krasol® LBH-P 5000 resin containing a hydroxyl number of 21.7, 32.5 g of hydroxyl terminated polybutadiene Poly bd R20LM resin containing a hydroxyl number of 101 and 400.3 g of ethyl acetate. The average OH groups calculated for this polyol was 2.1. Refluxed for 2 hours to dry the mixture followed by cooling to 75-80° C. To this was added 0.27 g of a 10 wt % toluene solution of dimethylbis[(1-oxoneodecyl)oxy]stannane with agitation for 15 minutes. Next 18.6 g of isophorone diisocyanate was added for an NCO/OH equivalent ratio of 0.95. The reactants were heated at 75-80° C. until the wt % NCO was determined per standard methodology and found to be 0.0 wt % followed by drop wise addition of 1.34 g isocyanatopropyltrimethoxysilane. Heating was continued until wt % NCO was 0.0 wt % then cool to room temperature.

Adhesive II of Example 2 consisted of a silylated polyester polyurethane and was prepared as follows: To a resin reaction vessel equipped with mixing capability, condenser, nitrogen atmosphere and heating was added 14.0 g of hydroxyl terminated poly(diethylene glycol glycerine adipate) resin containing a hydroxyl number of 90 with approximately 4.2 OH groups, 126.0 g poly(1,4-butanediol neopentyl glycol adipate) diol resin containing a hydroxyl number of 35, and 221.4 g of ethyl acetate. The average OH groups calculated for this blend of polyols was 2.22. Refluxed for 2 hours to dry the mixture followed by cooling to approximately 75° C. To this was added 0.09 g of a 10 wt % toluene solution of dimethylbis[(1-oxoneodecyl)oxy]stannane with agitation for 15 minutes. Next 10.6 g of isophorone diisocyanate was added for an NCO/OH equivalent ratio of 0.93. The reactants were heated at approximately 75° C. until the wt % NCO was determined per standard methodology and found to be 0.00 wt % then 1.3 g isocyanatopropyltrimethoxysilane was added and heated until 0.00 wt % NCO determined.

Adhesives I and II of Example 2 were blended 50/50 w/w then bar coated (Adhesives I and II were similarly bar coated) to give a 40 micron adhesive thickness on 50 micron PET film, air dried 10 minutes then cured 2 minutes at 150° C. These were then tested after one week at room temperature. Peel adhesion per PSTC-101 using standard stainless steel test panels was recorder and is presented in Table 1.

TABLE 1

| Ratio of I/II Adhesive Blends | Peel Adhesion, g/25 mm |
| --- | --- |
| 100/0 | 895 |
| 50/50 | 1257 |
| 0/100 | 1349 |

Example 3

Example 3 (Illustrates Example 1 with an average 2.11 OH groups for this blend of polyols).

Example 3 was prepared as follows: To a resin reaction vessel equipped with mixing capability, condenser, nitrogen atmosphere and heating was added 7.0 g of hydroxyl terminated polyester Lexorez® 1842-90 a poly(diethylene glycol glycerine adipate) resin containing a hydroxyl number of 90, 133.0 g of hydroxyl terminated polyester Lexorez® 1640-35 a poly(1,4-butanediol neopentyl glycol adipate) resin containing a hydroxyl number of 35, and 220.4 g ethyl acetate. The average OH groups calculated for this blend of polyols was 2.11. These resins were refluxed to reduce moisture. It was cooled to 75-80° C. then 0.18 g of a 10 wt % solution of dibutyltin bis(acetylacetonate) was added and agitated for 15 minutes. Next 9.9 g of isophorone diisocyanate (NCO/OH=0.93) was added with agitation. The temperature was maintained at 75+/−1° C. until the wt % NCO was determined per standard methodology was found to be 0.01 wt %. At this point 1.28 g of 3-isocyanatopropyltrimethoxysilane was added and agitation continued at temperature until wt % NCO was determined to be 0.004%. Solids adjusted to 40 wt % and viscosity of 416 cps determined using a Brookfield HATDV-II, spindle 4 at 50 rpm. Approximately a 25 g sample of the reaction product was dissolved in 13 g of ethyl acetate, 2 drops of a 10 wt % dimethyltin bis[(1-oxoneodecyl)oxy]

stannane in toluene solution, 0.2 g water were mixed thoroughly then allowed to set for 30 minutes at which time the solution was bar coated onto 50 micron PET film. After a 10 minute air dry period the adhesive was placed in a 135° C. oven for 3 minutes. Adhesive thickness was determined to be 25 microns. Peel adhesion (PSTC-101) for 1 inch tapes applied to and allowed 20 minute dwell prior to testing failed cohesively.

Example 4

Example 4 (Illustrates Example 1 with an average 2.06 OH groups for this blend of polyols).

Example 4 was prepared as follows: To a resin reaction vessel equipped with mixing capability, condenser, nitrogen atmosphere and heating was added 3.5 g of hydroxyl terminated polyester Lexorez® 1842-90 a poly(diethylene glycol glycerine adipate) resin containing a hydroxyl number of 90, 133.0 g of hydroxyl terminated polyester Lexorez® 1640-35 a poly(1,4-butanediol neopentyl glycol adipate) resin containing a hydroxyl number of 35, and 220.4 g ethyl acetate. The average OH groups calculated for this blend of polyols was 2.06. These resins were refluxed to reduce moisture. It was cooled to 75-80° C. then 0.18 g of a 10 wt % solution of dibutyltin bis(acetylacetonate) was added and agitated for 15 minutes. Next 9.9 g of isophorone diisocyanate (NCO/OH=0.93) was added with agitation. The temperature was maintained at 75+/−1° C. until the wt % NCO was determined per standard methodology was found to be 0.01 wt %. At this point 1.28 g of 3-isocyanatopropyltrimethoxysilane was added and agitation continued at temperature until wt % NCO was determined to be 0.004%. Solids adjusted to 40 wt % and viscosity of 416 cps determined using a Brookfield HATDV-II, spindle 4 at 50 rpm. Approximately a 25 g sample of the reaction product was dissolved in 13 g of ethyl acetate, 2 drops of a 10 wt % dimethyltin bis[(1-oxoneodecyl)oxy]stannane in toluene solution, 0.2 g water were mixed thoroughly then allowed to set for 30 minutes at which time the solution was bar coated onto 50 micron PET film. After a 10 minute air dry period the adhesive was placed in a 135° C. oven for 3 minutes. Adhesive thickness was determined to be 25 microns. Peel adhesion (PSTC-101) for 1 inch tapes applied to and allowed 20 minute dwell prior to testing failed cohesively.

Example 5

Example 4 (illustrates selection of catalyst can provide an adhesive better than found in Example 4) was repeated except the dibutyltin bis(acetylacetonate) catalyst was replaced by dimethyltin bis[(1-oxoneodecyl)oxy]stannane. Reaction product viscosity was 1350 cps at 38.1 wt % solids. Approximately a 25 g sample of the reaction product was dissolved in 13 g of ethyl acetate, 2 drops of a 10 wt % dimethyltin bis[(1-oxoneodecyl)oxy]stannane in toluene solution, 0.2 g water were mixed thoroughly then allowed to set for 30 minutes at which time the solution was bar coated onto 50 micron PET film. After a 10 minute air dry period the adhesive was placed in a 80° C. oven for 3 minutes. Adhesive thickness was determined to be 50 microns. Peel adhesion (PSTC-101) for 1 inch tapes applied to stainless steel was 2202 g/in, glass 2572 g/in and aluminum 2264 g/in, all adhesively failed. A 6.3 mm×25 mm lap shear applied to a textured Delran cassette with a 10 g weight attached, tested in duplicate were immersed in stirred xylene and the time to failure determined to be 8 hours for the average. Adhesive swell due to 24 hours immersion in xylene was also determined to be four times initial adhesive thickness and appeared to be a swollen adhesive and did not dissolve.

Example 6

Example 6 (illustrates blending Example 5 adhesive with other adhesives)

On a solids basis adhesives were blended. Example 5 adhesive was formulated prior to blending with other adhesives as per Example 5. Tapes were aged one week at room temperature then tested per PSATC-101. Peel adhesion results for the various blends of example 6 are displayed in Table 1A.

TABLE 1A

| Example 5% Adhesive | Other Adhesive | PSTC-101 Peel Adhesion |
|---|---|---|
| 20 | Ashland 1085-38[1] | 1884 g/25 mm |
| 40 | Ashland 1085-38[1] | 1892 g/25 mm |
| 20 | Silgrip PSA6574[2] | 2107 g/25 mm |

[1]Ashland Chemical
[2]GE Advanced Materials-Silicones

Example 7

Example 7 (Illustrates Example 1 with polyester diol based silylated polyurethane polymer).

Example 7 was prepared as follows: To a resin reaction vessel equipped with mixing capability, condenser, nitrogen atmosphere and heating was added 140.0 g of hydroxyl terminated polyester Lexorez® 1640-35 a poly(1,4-butanediol neopentyl glycol adipate) resin containing a hydroxyl number of 35, and 219.3 g ethyl acetate. The average OH groups calculated for this blend of polyols was 2.00. These resins were refluxed to reduce moisture. It was cooled to 75-80° C. then 0.18 g of a 10 wt % solution of dibutyltin bis(acetylacetonate) was added and agitated for 15 minutes. Next 9.1 g of isophorone diisocyanate (NCO/OH=0.93) was added with agitation. The temperature was maintained at 75+/−1° C. until the wt % NCO was determined per standard methodology was found to be 0.00 wt %. At this point 1.25 g of 3-isocyanatopropyltrimethoxysilane was added and agitation continued at temperature until wt % NCO was determined to be 0.004%. Solids adjusted to 40 wt % and viscosity of 248 cps determined using a Brookfield HATDV-II, spindle 4 at 50 rpm. Approximately a 25 g sample of the reaction product was dissolved in 13 g of ethyl acetate, 2 drops of a 110 wt % dimethyltin bis[(1-oxoneodecyl)oxy]stannane in toluene solution, 0.2 g water were mixed thoroughly then allowed to set for 30 minutes at which time the solution was bar coated onto 50 micron PET film. After a 10 minute air dry period the adhesive was placed in a 135° C. oven for 3 minutes. Adhesive thickness was determined to be 25 microns. Peel adhesion (PSTC-101) for 1 inch tapes applied to and allowed 20 minute dwell prior to testing failed cohesively.

Example 8

Example 8 (illustrates further that even with alternate catalyst, average OH groups calculated polyols was 2.00, failed cohesively) was repeated except the dibutyltin bis(acetylacetonate) catalyst was replaced by dimethyltin bis[(1-oxoneodecyl)oxy]stannane. Reaction product viscosity was 3700 cps at 65.0 wt % solids. Approximately a 25 g sample of the reaction product was dissolved in 29 g of ethyl acetate, 2 drops of a 10 wt % dimethyltin bis[(1-oxoneodecyl)oxy] stannane in toluene solution, 0.3 g water were mixed thoroughly then allowed to set for 30 minutes at which time the solution was bar coated onto 50 micron PET film. After a 10 minute air dry period the adhesive was placed in a 80° C. oven for 3 minutes. Adhesive thickness was determined to be 50 microns. Peel adhesion (PSTC-101) for 1 inch tapes applied to stainless steel cohesively failed.

Example 9

Example 9 (Illustrates Example 1 with an average 2.22 OH groups for this blend of polyols and the use of aminosilane capping agent).

Example 9 was prepared as follows: To a resin reaction vessel equipped with mixing capability, condenser, nitrogen atmosphere and heating was added 14.0 g of hydroxyl terminated polyester Lexorez® 1842-90 a poly(diethylene glycol glycerine adipate) resin containing a hydroxyl number of 90, 126.0 g of hydroxyl terminated polyester Lexorez® 1640-35 a poly(1,4-butanediol neopentyl glycol adipate) resin containing a hydroxyl number of 35, and 225.0 g ethyl acetate. The average OH groups calculated for this blend of polyols was 2.22. These resins were refluxed to reduce moisture. It was cooled to 75-80° C. then 0.08 g of a 10 wt % solution of dibutyltin bis(acetylacetonate) was added and agitated for 15 minutes. Next 10.8 g of isophorone diisocyanate (NCO/OH=1.07) was added with agitation. The temperature was maintained at 75+/−1° C. until the wt % NCO was determined per standard methodology was found to be 0.069 wt %. At this point 1.31 g of N-ethyl-aminoisobutyltrimethoxysilane was added and agitation continued while cooling to room temperature. Solids adjusted to 41 wt % and viscosity of 336 cps determined using a Brookfield HATDV-II, spindle 4 at 50 rpm. Approximately a 25 g sample of the reaction product was dissolved in 13 g of ethyl acetate, 2 drops of a 10 wt % dimethyltin bis[(1-oxoneodecyl)oxy]stannane in toluene solution, 0.2 g water were mixed thoroughly then allowed to set for 30 minutes at which time the solution was bar coated onto 50 micron PET film. After a 10 minute air dry period the adhesive was placed in a 150° C. oven for 3 minutes. Adhesive thickness was determined to be 25 microns. Peel Adhesion (PSTC-101) for 1 inch tapes applied to and allowed 20 minute dwell prior to testing, then peeled at 300 mm/minute 180° was 1494 g/25 mm on stainless steel, glass gave 2140 g/25 mm, aluminum 2218 g/25 mm, PVC 2044 g/25 mm, and HDPE 2210 g/25 mm. A 6.3 mm×25 mm lap shear applied to a textured Delran cassette with a 10 g weight attached, tested in triplicate were immersed in stirred xylene and the time to failure determined to be 6.7 hours for the average. Adhesive swell due to 24 hours immersion in xylene was also determined to be five times initial adhesive thickness and appeared to be a swollen adhesive and did not dissolve.

Example 10

Example 10 (Illustrates Example 1 with an average 2.22 OH groups for this blend of polyols and a crystalline diol melting range 35-45 C).

Example 10 was prepared as follows: To a resin reaction vessel equipped with mixing capability, condenser, nitrogen atmosphere and heating was added 10.0 g of hydroxyl terminated polyester Lexorez® 1842-90 a poly(diethylene glycol glycerine adipate) resin containing a hydroxyl number of 90, 90.0 g of hydroxyl terminated polyester Desmophen® S-1015-35 a polyester diol resin containing a hydroxyl number of 35 and a melt transition temperature range of 35-45° C., and 239.0 g ethyl acetate. The average OH groups calculated for this blend of polyols was 2.26. These resins were refluxed to reduce moisture. It was cooled to 75-80° C. then 0.09 g of a 10 wt % solution of dibutyltin bis(acetylacetonate) was added and agitated for 15 minutes. Next 7.6 g of isophorone diisocyanate (NCO/OH=0.93) was added with agitation. The temperature was maintained at 75+/−1° C. until the wt % NCO was determined per standard methodology was found to be 0.047 wt %. At this point 0.88 g of 3-isocyanatopropyltrimethoxysilane was added and agitation continued at temperature until wt % NCO was determined to be 0.003%. then agitation continued while cooling to room temperature. Solids adjusted to 31 wt % and viscosity of 12200 cps determined using a Brookfield HATDV-II, spindle 3 at 50 rpm. Approximately a 25 g sample of the reaction product was dissolved in 13 g of ethyl acetate, 2 drops of a 10 wt % dimethyltin bis[(1-oxoneodecyl)oxy]stannane in toluene solution, 0.2 g water were mixed thoroughly then allowed to set for 30 minutes at which time the solution was bar coated onto 50 micron PET film. After a 10 minute air dry period the adhesive was placed in a 135° C. oven for 3 minutes. Adhesive thickness was determined to be 25 microns. Peel Adhesion (PSTC-101) for 1 inch tapes applied to and allowed 20 minute dwell prior to testing, then peeled at 300 mm/minute 180° was 1394 g/25 mm on stainless steel, glass gave 1638 g/25 mm, aluminum 1389 g/25 mm, PVC 1346 g/25 mm, and HDPE 1268 g/25 mm.

Example 11

Example 11 (Illustrates Example 1 with an average 2.22 OH groups for this blend of polyols and a crystalline polyester diol with higher melt transition temperature range 75-80 C at which a hot melt adhesive rather than pressure sensitive adhesive was obtained).

Example 11 was prepared as follows: To a resin reaction vessel equipped with mixing capability, condenser, nitrogen atmosphere and heating was added 10.0 g of hydroxyl terminated polyester Lexorez® 1842-90 a poly(diethylene glycol glycerine adipate) resin containing a hydroxyl number of 90, 90.0 g of hydroxyl terminated polyester Desmophen® S-1072-30 a polyester diol resin containing a hydroxyl number of 35 and a melt transition temperature range of 75-80° C., and 237.3 g ethyl acetate. The average OH groups calculated for this blend of polyols was 2.22. These resins were refluxed to reduce moisture. It was cooled to 75-80° C. then 0.09 g of a 10 wt % solution of dibutyltin bis(acetylacetonate) was added and agitated for 15 minutes. Next 7.6 g of isophorone diisocyanate (NCO/OH=0.93) was added with agitation. The temperature was maintained at 75+/−1° C. until the wt % NCO was determined per standard methodology was found to be 0.08 wt %. At this point 0.87 g of 3-isocyanatopropyltrimethoxysilane was added and agitation continued at temperature until wt % NCO was determined to be 0.01%. Agitation continued while cooling to room temperature. Solids were determined to be 30 wt % and the composition was a hot melt adhesive rather than being a pressure sensitive adhesive at room temperature.

Example 12

Example 12 (Illustrates Example 1 possessing an average 2.22 OH groups for this blend of polyols and a crystalline polyester diol with higher melt transition temperature range 50-60 C at which a hot melt adhesive rather than pressure sensitive adhesive was obtained).

Example 12 was prepared as follows: To a resin reaction vessel equipped with mixing capability, condenser, nitrogen atmosphere and heating was added 10.0 g of hydroxyl terminated polyester Lexorez® 1842-90 a poly(diethylene glycol glycerine adipate) resin containing a hydroxyl number of 90, 90.0 g of hydroxyl terminated polyester Desmophen® 2505 a polyester diol resin containing a hydroxyl number of 28 and a melt transition temperature range of 50-60° C., and 236.4 g ethyl acetate. The average OH groups calculated for this blend of polyols was 2.22. These resins were refluxed to reduce moisture. It was cooled to 75-80° C. then 0.09 g of a 10 wt % solution of dibutyltin bis(acetylacetonate) was added and agitated for 15 minutes. 6.4 g of isophorone diisocyanate (NCO/OH=0.93) was added with agitation. The temperature was maintained at 75+/−1° C. until the wt % NCO was determined per standard methodology was found to be <0.01 wt %. 0.77 g of 3-isocyanatopropyltrimethoxysilane was added and agitation continued at temperature until wt % NCO was determined to be <0.01%. Agitation continued while cooling to room temperature. Solids were determined to be 32.5 wt %, viscosity 1240 cps. Approximately a 25 g sample of the reaction product was dissolved in 13 g of ethyl acetate, 2 drops of a 10 wt % dimethyltin bis[(1-oxoneodecyl)oxy] stannane in toluene solution, 0.2 g water were mixed thoroughly then allowed to set for 30 minutes at which time the solution was bar coated onto 50 micron PET film. After a 10 minute air dry period the adhesive was placed in a 75° C. oven for 30 minutes. The adhesive coating was a hot melt adhesive rather than a pressure sensitive adhesive at room temperature.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. A silylated polyurethane composition comprising silylated polyurethane prepolymer prepared from a process which comprises: (a) reacting a polyol being a blend of two or more polyester polyols possessing an average of hydroxyl group of the blend ranging from about 2.05 to about 2.75 with a polyisocyanate in the presence of a catalyst at a molar ratio of NCO to OH from about 0.3 to about 0.95 to provide a hydroxyl-terminated polyurethane prepolymer, (b) reacting said hydroxyl-terminated polyurethane prepolymer with an isocyanatosilane to form said silylated polyurethane prepolymer, wherein less than 95 percent of the hydroxyl-terminated polyurethane prepolymer is silylated, with the proviso that if said polyester polyol comprises a crystalline polyester diol, said diol has a melting point of less than 50° C.

2. The silylated polyurethane composition of claim 1 wherein said catalyst is selected from the group consisting of organoamine and organotin.

3. The silylated polyurethane composition of claim 2 wherein said catalyst is selected from the group consisting of dialkyltin dicarboxylates, tertiary amines, stannous salts of carboxylic acids.

4. The silylated polyurethane composition of claim 1 further comprising an additional adhesive material.

5. The silylated polyurethane composition of claim 4 wherein the additional adhesive material is at least one selected from the group consisting of silane-terminated polyurethane, polyurethane, silicone, natural rubber, styrene butadiene rubber, styrene isoprene styrene, isoprene, acrylic, and polyisobutylene.

6. The silylated polyurethane composition of claim 1 wherein the isocyanatosilanes are those of the general formula:

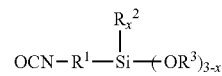

wherein $R^1$ is a divalent alkylene group of from 3 to 10 carbon atoms, $R^2$ and $R^3$ each independently is an alkyl group of from 1 to 6 carbon atoms or an aryl group of from 6 to 8 carbon atoms, and x has a value of 0, 1 or 2.

7. The silylated polyurethane composition of claim 1 wherein the isocyanatosilanes is selected from the group consisting of λ-isocyanatopropyltrimethoxysilane, λ-isocyanatopropyltriethoxy-silane, λ-isocyanatomethylpropyltrimethoxysilane, λ-isocyanatomethylpropyltriethoxysilane, λ-isocyanatopropylmethyldimethoxysilane, λ-isocyanatopropyldimethylmethoxysilane and λ-isocyanatomethylpropyldimethylmethoxysilane and mixtures thereof.

8. A curable pressure sensitive adhesive composition comprising a pressure sensitive adhesive amount of the silylated polyurethane composition of claim 1.

9. A curable pressure sensitive adhesive composition comprising a pressure sensitive adhesive amount of the silylated polyurethane composition of claim 5.

10. The curable pressure sensitive adhesive composition of claim 8 comprising at least one additional component selected from the group consisting of filler, tackifier, silane adhesion promoter, plasticizer, solvent, thixotropic agent, U.V. stabilizer, antioxidant and curing catalyst.

11. The curable pressure sensitive adhesive composition of claim 10 wherein the tackifier is MQ tackifier resin containing curing catalyst therefor.

12. The cured pressure sensitive adhesive composition of claim 8.

13. The cured pressure sensitive adhesive composition of claim 9.

14. The cured pressure sensitive adhesive composition of claim 10.

15. The cured pressure sensitive adhesive composition of claim 11.

16. The curable pressure sensitive adhesive composition of claim 9 comprising at least one additional component selected from the group consisting of filler, tackifier, silane adhesion promoter, plasticizer, solvent, thixotropic agent, U.V. stabilizer, antioxidant and curing catalyst.

17. The curable pressure sensitive adhesive composition of claim 16 wherein the tackifier is MQ tackifier resin containing curing catalyst therefor.

18. The cured pressure sensitive adhesive composition of claim 16.

19. The cured pressure sensitive adhesive composition of claim 17.

20. The composition of claim 1 wherein said catalyst is dimethyltinbis[(1-oxoneodecyl)oxy]stannane.

21. The composition of claim 1 wherein the weight percent of Si in the silylated polyurethane prepolymer is from 0.098% to 0.118%.

22. The silylated polyurethane composition of claim 1 wherein said polyester polyol comprises a crystalline polyester polyol having a melting point of less than 50° C.

23. The silylated polyurethane composition of claim 1 wherein said polyester polyol does not contain a crystalline polyester polyol having a melting point of greater than 50° C.

* * * * *